United States Patent [19]

Amano et al.

[11] Patent Number: 5,703,791
[45] Date of Patent: Dec. 30, 1997

[54] ELECTRIC POWER SYSTEM STABILIZATION CONTROL APPARATUS AND METHOD THEREOF

[75] Inventors: Masahiko Amano, Hitachioota; Masahiro Watanabe, Hitachi; Hiroo Konishi, Hitachinaka; Shinya Tanifuji, Hitachi; Tomoharu Nakamura, Hitachioota, all of Japan

[73] Assignee: Hitachi, Ltd., Tokyo, Japan

[21] Appl. No.: 387,097

[22] Filed: Feb. 13, 1995

[30] Foreign Application Priority Data

Feb. 17, 1994 [JP] Japan ................... 6-020114

[51] Int. Cl.⁶ .................................... H02H 7/06
[52] U.S. Cl. ........................ 364/492; 322/20; 322/58
[58] Field of Search ................... 363/74, 78, 95, 363/96; 364/152, 164, 492, 495, 176, 180, 183, 493, 494, 576, 710.14, 148; 322/20, 19, 21, 22, 23, 24, 25, 58; 323/204, 234, 246, 318, 350, 211, 265, 275, 349; 361/54, 56, 57, 58

[56] References Cited

U.S. PATENT DOCUMENTS

| | | | |
|---|---|---|---|
| 4,214,289 | 7/1980 | Otsuka et al. | 361/20 |
| 4,701,689 | 10/1987 | Yuan et al. | 322/19 |
| 4,733,156 | 3/1988 | Tanaka et al. | 322/20 |
| 4,785,405 | 11/1988 | Hasegawa et al. | 364/480 |
| 4,967,129 | 10/1990 | Tanaka | 318/621 |
| 5,296,764 | 3/1994 | Asplund et al. | 307/521 |
| 5,300,876 | 4/1994 | Takagi | 322/58 |
| 5,424,627 | 6/1995 | Clark et al. | 323/210 |

FOREIGN PATENT DOCUMENTS

| | | | |
|---|---|---|---|
| 56-41725 | 4/1981 | Japan | H02J 3/24 |
| 61-154428 | 7/1986 | Japan | H02J 3/24 |
| 4-121024 | 4/1992 | Japan | H02J 3/24 |

OTHER PUBLICATIONS

Sugimoto et al., "Implementation and Experiments of Integrated Control of Exciter, Turbine Valve and Shunt Damping Resistor", Electrical Engineering in Japan, vol. 106, No. 6, pp. 117–126, 1986.

*Primary Examiner*—Emanuel T. Voeltz
*Assistant Examiner*—Tony M. Cole
*Attorney, Agent, or Firm*—Fay, Sharpe, Beall, Fagan, Minnich & McKee

[57] ABSTRACT

A system information input means takes in system information and a system state determining means determines states of the system. A component operation state determination means determines operation states of system stabilizing components. A control plan deciding means decides a control plan of the system in consideration of operation states of the system and the system stabilizing components. In deciding the control plan, a swing mode analyzing means firstly analyzes the swing mode at each place of the system on the basis of waveforms of time domain response simulations. Then, a control allotment setting means determines control allotment for each of the system stabilizing components based on the mode analysis and a control parameter setting means control sets the control parameters of each of the system stabilizing components. If plural control plans are obtained, the optimal one is selected based on eigenvalues of dynamics of the system or by evaluating time domain system responses by simulation method. The decided control plan is output to the system stabilizing components by a control plan output means.

14 Claims, 8 Drawing Sheets

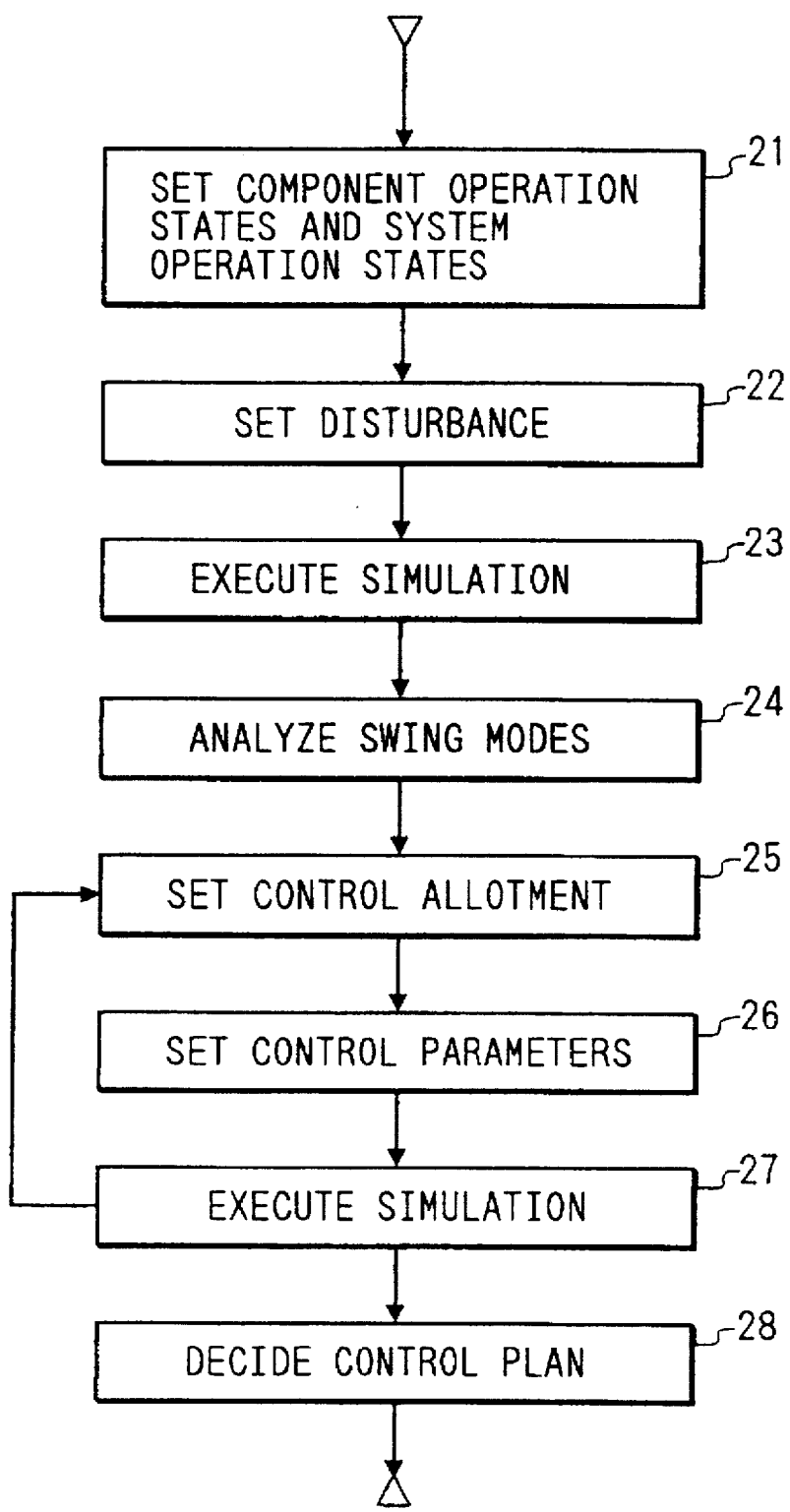

FIG. 8

| CONTINGENCY LOCATION | SVC PARAMETERS | | | FWG PARAMETERS | | |
|---|---|---|---|---|---|---|
| | GAIN | T1 | T2 | GAIN | T1 | T2 |
| TRANSMISSION LINE A | 1.0 | 0.5 | 0.1 | 1.5 | 0.5 | 0.2 |
| TRANSMISSION LINE B | 1.5 | 0.4 | 0.2 | 3.0 | 0.8 | 0.3 |
| BUS D OF SUBSTATION C | 2.0 | 0.5 | 0.2 | 2.0 | 1.5 | 0.2 |
| ⋮ | ⋮ | ⋮ | ⋮ | ⋮ | ⋮ | ⋮ |

ELECTRIC POWER SYSTEM STABILIZATION CONTROL APPARATUS AND METHOD THEREOF

BACKGROUND OF THE INVENTION

1. Field of the Invention

The present invention relates to a power system stabilization control apparatus and a method thereof for suppressing a swing occurring in the power system, particularly to a power system stabilization control apparatus and a method thereof capable of flexibly and certainly responding to various kinds of disturbances and operation conditions in a power system by cooperatively controlling system stabilizing control components (referred to as control components) installed at plural places.

2. Description of the Related Art

Conventionally, the following control components for suppressing a power swing by faults, etc. are used, that is, PSS (Power System Stabilizer) attached to an exciting control component of a generator, a static vat compensator (SVC), a thyristor control series capacitor, a thyristor control high-speed phase shifting device, a flywheel generator (FWG), Superconducting Magnetic Energy storage (SMES), a battery, etc..

Those control components stabilize the power system by detecting signals indicating a power swing and applying a feedback control to the power system based on the detected signals. States of a power swing in a power system variously change, affected by the condition of connection states of the power system, power flow states, and a place and a size of disturbances etc.. Then, a stabilizing method should be such as to control a power swing optimally corresponding to the above-mentioned state changes. As one of such conventional stabilizing methods, a technique is disclosed by Japanese Patent Application Laid-Open 121024/1992 wherein a control gain of SVC is changed corresponding to an amount of a line power flow.

In case plural stabilizing components are provided in a power system, they need to operate harmoniously with each other. If a stabilizing method needs to be changed corresponding to changes of the connection states or the power flow states, cooperation among the control components is necessary to realize such adequate controls. Further, in case plural modes of power swings occur, it is necessary to fix control allotment to each of the control components for corresponding to each of the plural modes of the power swing. However, the above-mentioned conventional technique can not fix the control allotment to plural control components since the conventional technique deals with only one control component and can not take operation states of other control components into account.

SUMMARY OF THE INVENTION

The present invention has been achieved in consideration of the above-described problems, and is aimed at providing a power system stabilization control apparatus and a method thereof capable of changing control plans for plural stabilizing components with cooperation among plural control components for accomplishing adequate control of a power system even though there occur changes in the connection states, power flow states, disturbance conditions and so on.

In order to attain the above-mentioned objects, the present invention relates to a power system stabilization control means comprising a system information input means for taking in system information of a power system, a component operation state determination means for judging operation states of control components, a system state determination means for judging system states of the power system on the basis of the input system states, a control plan decision means for deciding a control plans for the control components on the basis of the determined states of the power system and the control components, and a control plan output means for sending the decided plan to the control components.

Furthermore, the power system stabilization control means includes a contingency setting means for preparing control plans corresponding to preset contingencies in advance, and a control plan table making means for storing the control plans corresponding to the contingencies in a control plan table, the control plan decision means of the power system stabilization control means deciding control plans by making use of the prepared control plans corresponding to the contingencies.

Further, a control plan selection means is included by which a operator can select a control plan from control plans presented by the control plan selection means. Then the control plan decision means of the power system stabilization control means inputs the selected control plan to the control plan output means.

Further, the power system stabilization control means includes a swing mode analysis means for determining possible swing modes generated by a disturbance on the basis of the system information and the component operation state information of the power system and a control allotment setting means for extracting the swing modes to be controlled from the plural possible swing modes and for allotting a control of each one of the swing modes to be controlled to each of the control components.

Moreover, the power system stabilization control means having the swing mode analysis means for determining possible swing modes generated by a disturbance on the basis of the system information and the component operation state information of the power system, includes a control parameter setting means for setting control parameters to each of the control components for suppressing the extracted swing modes.

By the present invention, it is possible to decide adequate control plans in accordance with the system states since the control plan decision means decides such a control plan for the control components on the basis of the states of the power system and the control components, so that the control plan harmoniously the operates control components.

In deciding control plans, a time domain response simulation is firstly carried out to each one of contingencies for analyzing modes and occurring places of power swings. On the basis of results of the analyzing, a control component at each place where the power swing occurs, is allotted to each swing mode. Control parameters are set to each of the allotted control components corresponding to each one of the allotted swing modes. It is possible to decide an adequate control plan by allotting a control for each of the swing modes to an adequate one of the control components, based on the results of the swing mode analysis.

If the control plan table prepared in advance is utilized, a control plan can be directly assigned. In that case, a control plan can be quickly decided since the step of searching an adequate plan from many possible control plans can be omitted by preparing each control plan corresponding to each one of typical system states and each one of component operation states, as the control plan table.

Further, if control plans are determined in advance to the assumed typical disturbances set by the contingency setting means and stored in the control plan table b the control plan table making means, it is possible to decide a control plan by the control plan decision means on occurrence of an actual disturbance by determining the occurring place and the kind of the disturbance based on the information from the system information input means and the system state determination means, and selecting a control plan corresponding to the occurring place and the kind of the disturbance from the control plan table.

Further, by providing a function of displaying a control plan and evaluation results of the control plan via the control plan selection means to an operator, the operator can interactively select an adequate control plan via the control plan selection means, while he is looking at the display.

Further, if the power system stabilization control apparatuses of the present invention are installed at a plurality of areas, it is possible to decide a control plan, by using cooperation between the control components at one area and those at another area, since control plans at another area can be output from the power system stabilization control apparatus at another area via a control plan input/output means.

Further, even if the power system stabilization control apparatus has only one control component, the most efficient control can be realized by analyzing the power swing modes and allotting the control of the swing mode most required to be suppressed to that one control component.

Moreover, by analyzing power swing modes and setting control parameters to each of the control components for suppressing a specific power swing mode, the power system can be effectively stabilized, for example, even if a large power swing occurs, by operating plural control components for simultaneously responding to a dominant mode of the large power swing.

BRIEF DESCRIPTION OF THE DRAWINGS

FIG. 2 is a flow chart showing example procedures of control plan decision.

FIG. 8 is an example of a control plan table.

DETAILED DESCRIPTION OF THE EMBODIMENTS

Figure 1:
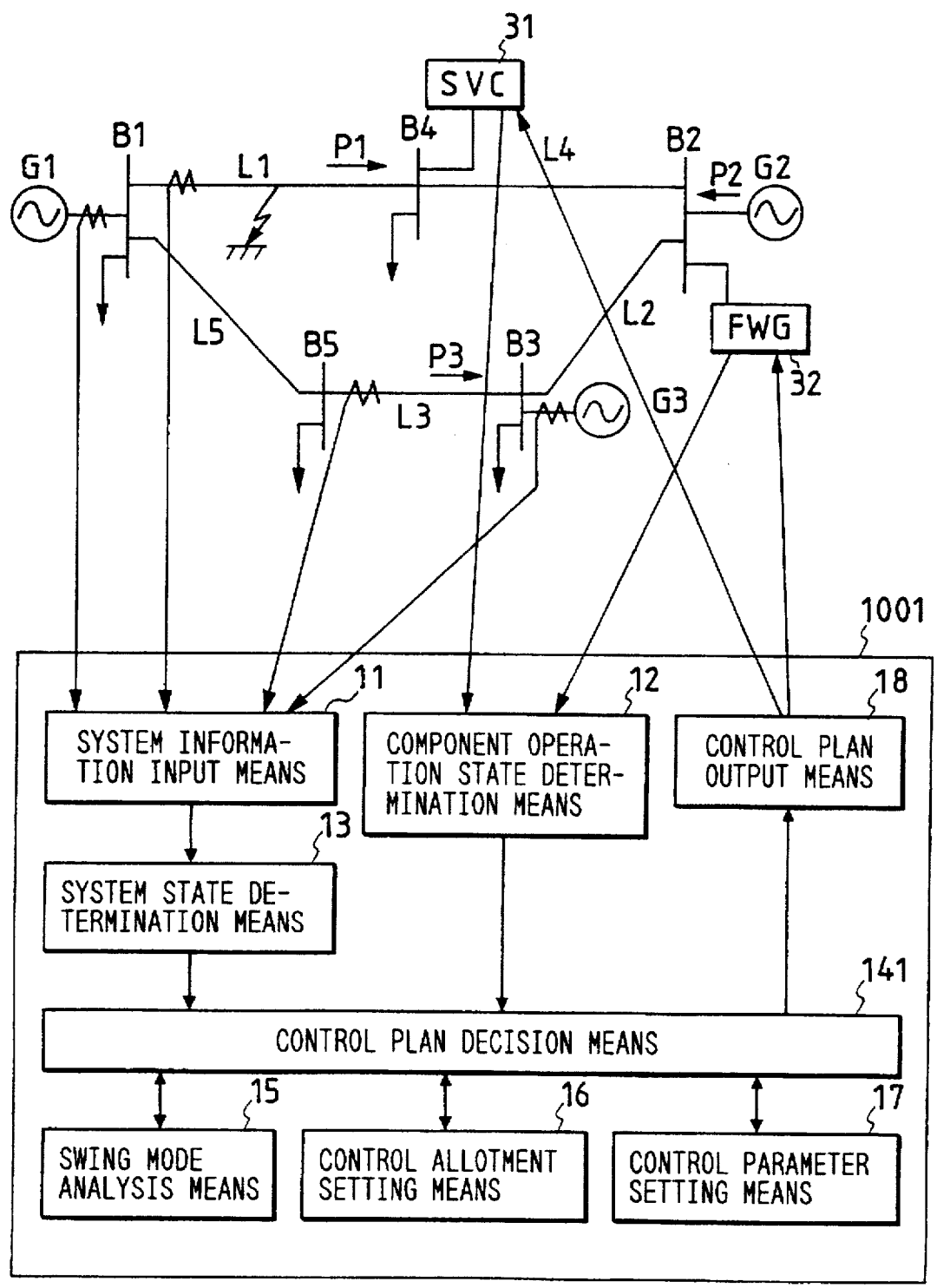
FIG. 1 is a block diagram showing a arrangement of a power system stabilization control apparatus according to the present invention.

Hereinafter, details of the present invention are explained by referring to the embodiments shown in the drawings.

FIG. 1 is a block diagram showing an arrangement of a power system stabilization control apparatus 1001 according to the present invention. To the apparatus is input system information on voltages, currents, power, connection states of switches and so on, detected at each place, via a system information input means 11. The system information further includes bus voltages, output power of each generator and power flows in transmission lines.

In the embodiment, SVC 31 and a flywheel generator (referred as FWG) 32 are installed as system stabilizing components (referred to control components) at plural places.

Operation states of components output from the control components are taken in via a component operation state input means 12. A system state determination means 13 obtains a system state satisfying a power flow equation after complements and corrections of the system information by state estimating calculation.

A control plan decision means 141 decides a control plan for the control components, by taking the system states and the component operation states into account, and a control plan output means 18 outputs the decided control plan to the control components. Auxiliary means are provided in the form of a swing mode analysis means 15, a control allotment setting means 16 and a control parameter setting means In the following, an example process of determining control plans by the control plan decision means 141 is explained, referring to the flow chart shown in FIG. 2.

At first, the system information is taken in by the system information input means 11.

As to SVC 31 and FWG 32, information on effective power and reactive power generated from or absorbed in each of the control components is taken in and stored as data in advance. Based on the above-mentioned system information, the system state determination means 13 determines the most likely system states to satisfy a power flow equation by executing system state estimation. The power flow equation is an equation expressing circuit characteristics of a power system, derived from Kirchhoff's law. However, on-line input information, generally, does not satisfy the power flow equation since the on-line input information contains errors and time delays. Therefore, the input information is corrected so as to satisfy the power equation by the system state estimation using a method such as least squares method. Such a correction method is disclosed by Japanese Patent Application Laid-Open No. 215124/1991.

As to operation states of the control components by the component operation state input means 12, the information on usable state or unusable state is expressed with 1 if usable or with 0 if unusable and taken in, and the effective amount of power, indicating the amount contributing to power system stabilization, is also taken in for specifying the component operation states more in detail as occasion demands. At the step 21, the component operation states and the system states are specified on the basis of results as obtained above.

At the step 22, an assumed disturbance (contingency), for example, a three phase short circuit fault of a transmission line L1, is suppositionally set, or a fault which actually occurred is also suppositionally set as occasion demands. At the step 23, a time domain response simulation is executed to the set disturbance.

At the step 24, a swing mode analysis means 15 analyzes swing mode of the power on the bases of the simulation results. The swing mode analysis examines what modes are included in the simulated response waveform of the power at each place where the power swing occurs.

Figure 3A:
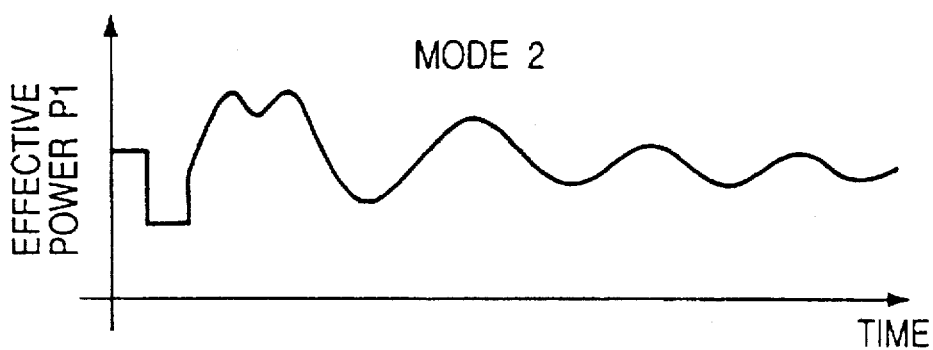
FIGS. 3A and 3B are graphs showing example time domain response simulation results of swing modes in power changes.
Figure 3B:
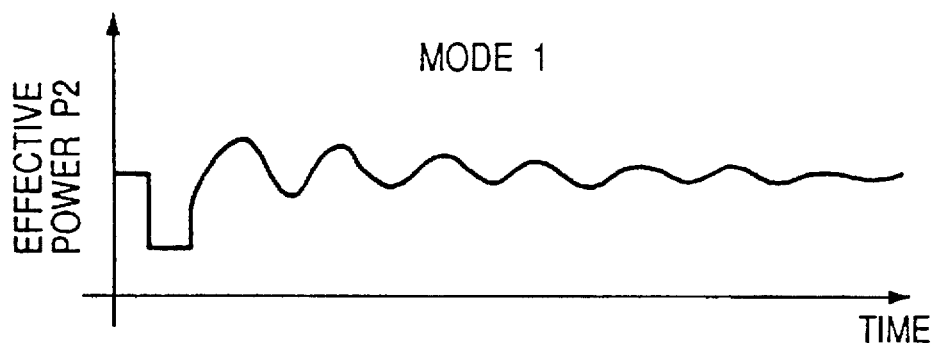

For example, it is assumed that time response waves of effective power P1 flowing between buses B1 and B4 and effective power P2 flowing out of a generator G2 are as shown in FIGS. 3A and 3B. It can be analyzed by a method such as a Fourier analysis method that, in the waveform of P1, a swing mode having a comparatively long period (referred to as mode 2) is dominantly contained, and in the shape of P2, a swing mode having a short period is shown. As mentioned above, there often occurs a power swing containing plural swing modes, and therefore, it is necessary to suppress such a power swing having plural swing modes by cooperatively operating a plurality of control components.

The swing mode analysis means 15 first calculates eigenvalues of system dynamics for examining what swing modes occur. The eigenvalues are eigenvalues of a coefficient matrix A of the following linearized state equation for expressing dynamics of a power system, the eigenvalues indicating what waveform of swing occurs when a disturbance is added to the power system.

$$dx/dt = Ax \quad (1)$$

, where x: state variable vector.

The eigenvalues can be obtained when line impedances, power flow states, dynamics of generators and control components are specified. The line impedances and the dynamics of generator are the fixed information and can be stored in a data base in advance.

As to the power flow states, the ones obtained at the step 21 can be used. As to control parameters of control components, though they are finally determined by the control plan decision means 141, standard parameters can be used as temporary parameters before the control parameters are finally fixed. The above-mentioned stability analysis method can be done by conventional techniques.

At the step 24, for each of time response waveforms, the containment degree of each swing mode in the response waveform is analyzed.

At the step 25, a control allotment setting means 16 allots a control to each of the control components. For example, if the effective power P1 is allocated to SVC 31 as a controlled quantity and the effective power P2 to FWG 32, the control allotment is determined so that SVC 31 suppresses the mode 2 and FWG 32 the mode 1, since the mode 2 is dominantly contained in the effective power P1 and the mode 1 in the effective power P2. If the control components can be controlled by using frequencies, voltages or relative phases besides the effective power information, this information is obtained at the previous step and used at the present step.

Now, if the number of the swing modes is more than that of the control components, the control allotment setting means 16 restricts the number of the swing modes to the same number as that of the control components. On the contrary, if the number of the swing modes is less than that of the control components, some of the swing modes may be controlled by plural control components.

Figure 4:
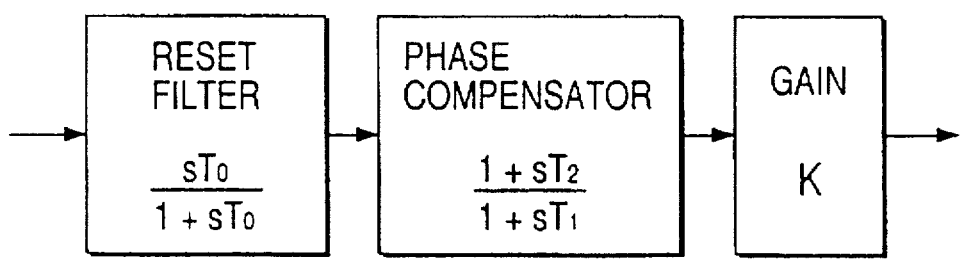
FIG. 4 is a block diagram showing a composition of SVC (Static Var Compensator).
Figure 5:
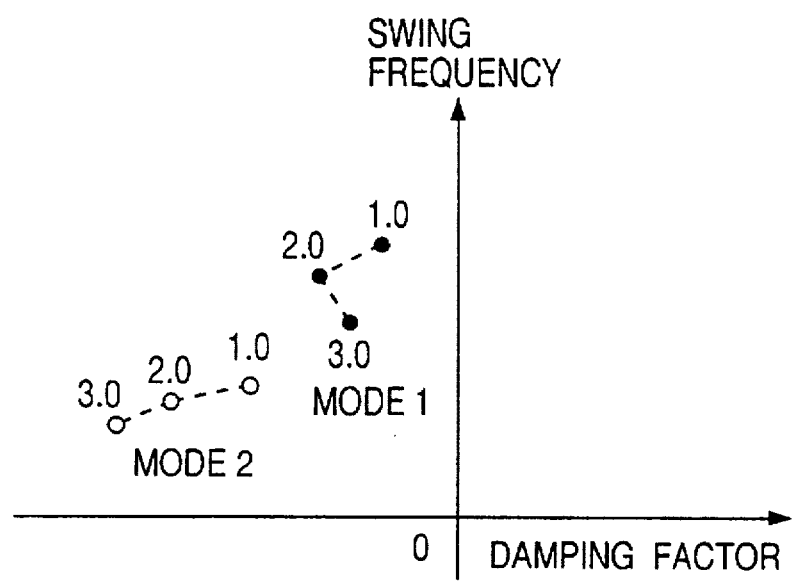
FIG. 5 shows eigenvalues of the dynamics of a power system.

At the step 26, when the control allotment is determined, a control parameter setting means 17 sets control parameters for FWG 32 and SVC 32. For example, in case each control unit of the control components is composed of a reset filter, a phase compensator and a gain as shown in FIG. 4, the control parameters are $T_0$, $T_1$, $T_2$, K. As to the control parameters of the reset filter and the phase compensator, if a swing mode allotted to each of the control component is determined, the control parameters can be specified based on the allotted swing mode. For example, if 90 degree phase delay is required, the phase compensator can be composed so that the compensated phase is 90 degree of phase delay in the problem swing frequency. The above-mentioned phase compensator can be realized by conventional techniques. As to the gain, its optimal value can be determined by observing changes of the eigenvalues in accordance with changes of the gain. For example, in case the respective eigenvalue changes, corresponding to the respective change of the gains of FWG 32 and SVC 31, in the domain of swing frequency and swing damping factor as shown in FIG. 5, the gain of 2.0 is selected for FWG 32 since the swing mode 1 is allotted to FWG 32 the gain of 3.0 for SVC 31 by taking notice of the eigenvalue of the swing monde 2.

If improvement of controlling one swing mode worsens controls of the other swing modes, the respective gain of the control components can be determined by weighting the eigenvalues and totally estimating the eigenvalues. For example, by using the summation of the respective weighted real part of the eigenvalue to the respective swing mode as an evaluation index, the gain is obtained so as to make the evaluation index minimum, since, if an eigenvalue has a negative real part, the larger the absolute value of the real part, the more the system becomes stable. In the evaluation process, the weight factor of the eigenvalue of the problem swing mode is made larger so that the problem swing mode is preferentially suppressed.

At the step 27, the time domain response simulation is executed on the basis of the set control parameters and effectiveness of the determined control plans is confirmed after the control parameters are set by the above-mentioned process. However, if the effectiveness of the determined control plans can not be confirmed, the process goes back to the step 25 and the control allotment is readjusted. If the effectiveness is confirmed, the process goes to the step 28 of deciding the control plans.

Though two control components are dealt with in the embodiment, more of the control components are generally provided, and it can sometimes happen that the control allotment can not be uniquely determined. For example, if two swing modes (X, Y) occur to three components (A, B, C), the combinations (A-X, B-Y, C-X) and (A-X, B-Y, C-Y) are possible as the control allotment. In such a case, the control allotment is determined by evaluating which combination has the most preferable control characteristics by using the response simulation or the eigenvalue analysis.

Further, though a controlled quantity and a control mode to each of the control components are fixed in the embodiment, it is possible that the controlled quantity or the control mode maybe selected. For example, if the swing modes P1 and P2 are possible as the controlled quantity of SVC 31 and selection of one swing mode is required, adequately setting the control quantity and the control mode to each of the control components can be carried out on the basis of the swing mode analysis for each of the swing modes P1 and P2 or the response simulation for each group of control parameters set to each of the swing modes. Further, since two control modes of a constant voltage control and a damping control can be considered as the control mode of SVC, selection of the control mode for SVC can be also on the basis of the above-mentioned swing mode analysis or the response simulation.

Figure 6:
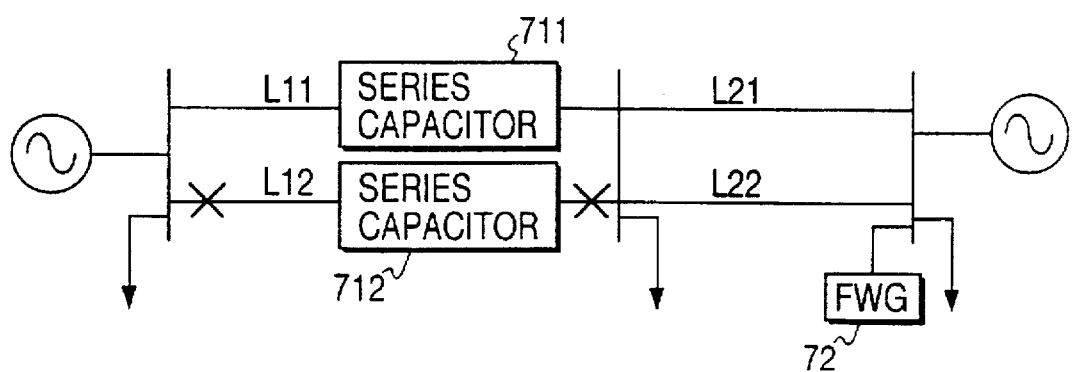
FIG. 6 shows an arrangement of a power system wherein two thyristor series capacitors are provided as system stabilizing components.

In the following, a control plan decision method in the case of operation state changing of a control component is explained. FIG. 6 shows an example in which two thyristor control series capacitors (referred to as a series capacitor)

711 and 712, and FWG 72 are provided as control components. Now, it is assumed that the transmission line L12 of the two transmission lines opens, each of the two series capacitors being arranged to each of the two transmission lines. Then, the information that the series capacitor 712 is unusable is taken in from the component state determination means 12. The control parameter setting means 17 resets control parameters for the series capacitor 711 and FWG 72 so that FWG 72 compensates the failing effects of the series capacitor 711, by taking operation states of the series capacitor 712 into account.

As mentioned above, since the control plans are determined by considering operation states of all control components, it is possible to determine the optimal control plans by cooperation among the control components.

Figure 7:
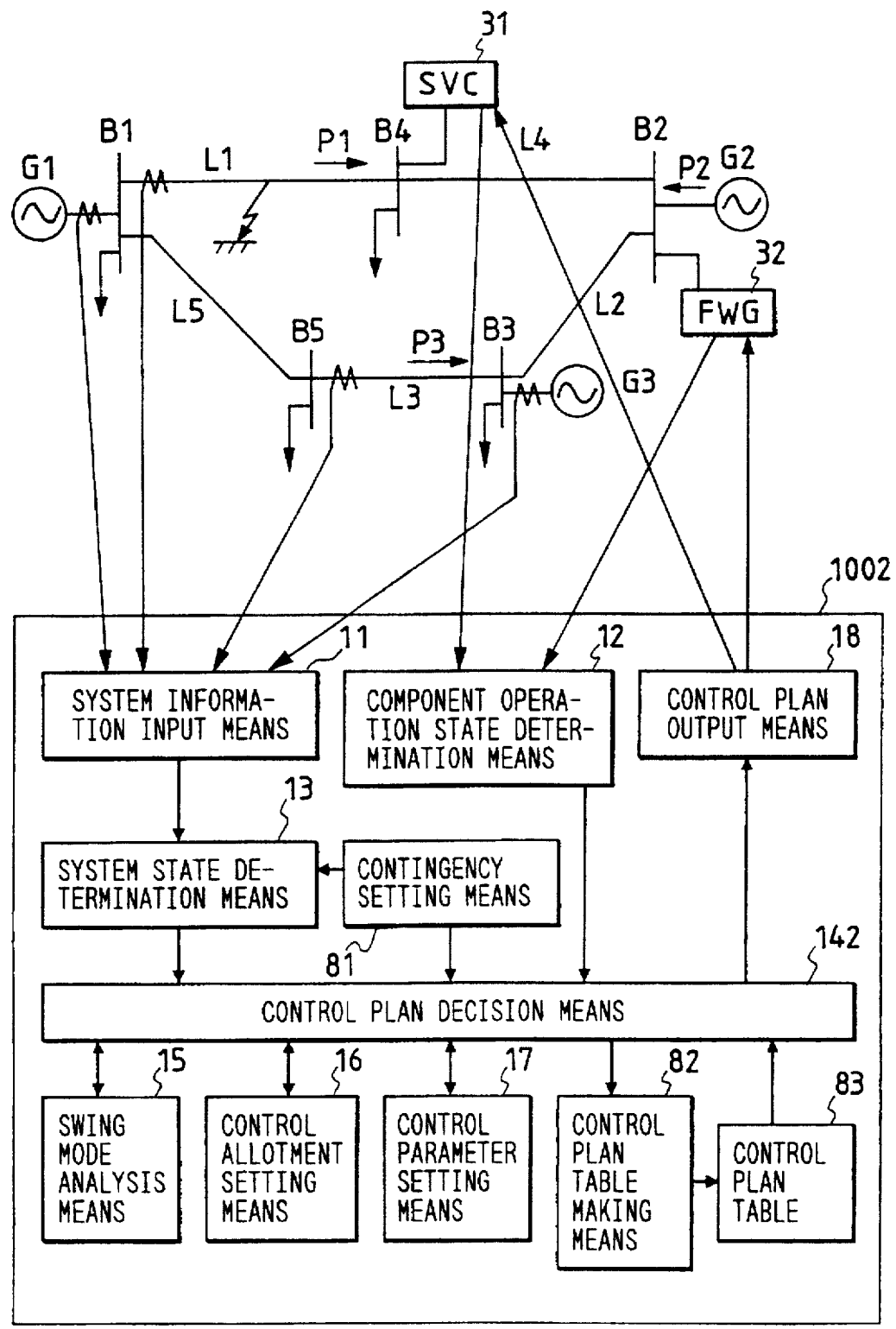
FIG. 7 is a block diagram showing a arrangement of a power system stabilization control apparatus including a contingency setting means according to the present invention.

In the following, another embodiment wherein control plans for a contingency are determined is explained. FIG. 7 shows a power system stabilization control apparatus 1002 of the another embodiment, including a contingency setting function added to the control plan decision means 142 of the power system stabilization control apparatus 1001 shown by FIG. 1, the contingency setting function being composed of a contingency setting means 81, a control plan table making means 82 and a control plan table 83.

In the contingency setting means 81, disturbances are assumed in advance, for example, a three phase short circuit fault is assumed and set. The system state determination means 13 judges disturbance states of the system based on system information from the system information input means 11. Since operation states of the control components probably change, the operation state changes of the control components are also taken into account. For example, in the occurrence of a fault in a transmission line at which a series capacitor is installed, the series capacitor at the problem transmission line becomes unusable.

Then, the control plan decision means 142 determines a control plan corresponding to each of the contingency states. The method of determining the control plan is the same as the one mentioned above. The determined control plan is transferred to the control plan table making means 82 and stored in such a table as the control plan table 83 shown in FIG. 8, by arranging the control plan to the corresponding contingency. The above-mentioned procedures are repeated by the number of the contingencies and adequate control plans of the possible disturbances are prepared in the control plan table 83.

In an actual disturbance occurrence, such information on the disturbance as operation information on a protection relay, a breaker, etc. are input as the system information from the system information input means 11. The system state determination means 13 identified the occurrence place and the kind of the disturbance on the basis of the input system information. The control plan decision means 142 searches the control plan table to find out a contingency corresponding to the actually occurring disturbance and determines the control plan for controlling the occurring disturbance, for example, by referring to the gain K and the time constants $T_0$, $T_1$ and $T_2$ of SVC for controlling the detected contingency. By the above-mentioned method, a control plan can be quickly determined by searching the control plan table. Though, in the embodiment shown by FIG. 8, the control allotment of the control components are determined in advance by analyzing the swing modes, the control plans and the control allotment can be obtained by providing the swing mode analysis means 15, the control allotment means 16 and the control parameter setting means 17 in another processing system and obtaining control plans by off-line process. In the processing method, it is possible to make a cheaper system of the power system stabilization control apparatus 1002 since the composition of the apparatus 1002 becomes simpler and smaller.

Figure 9:
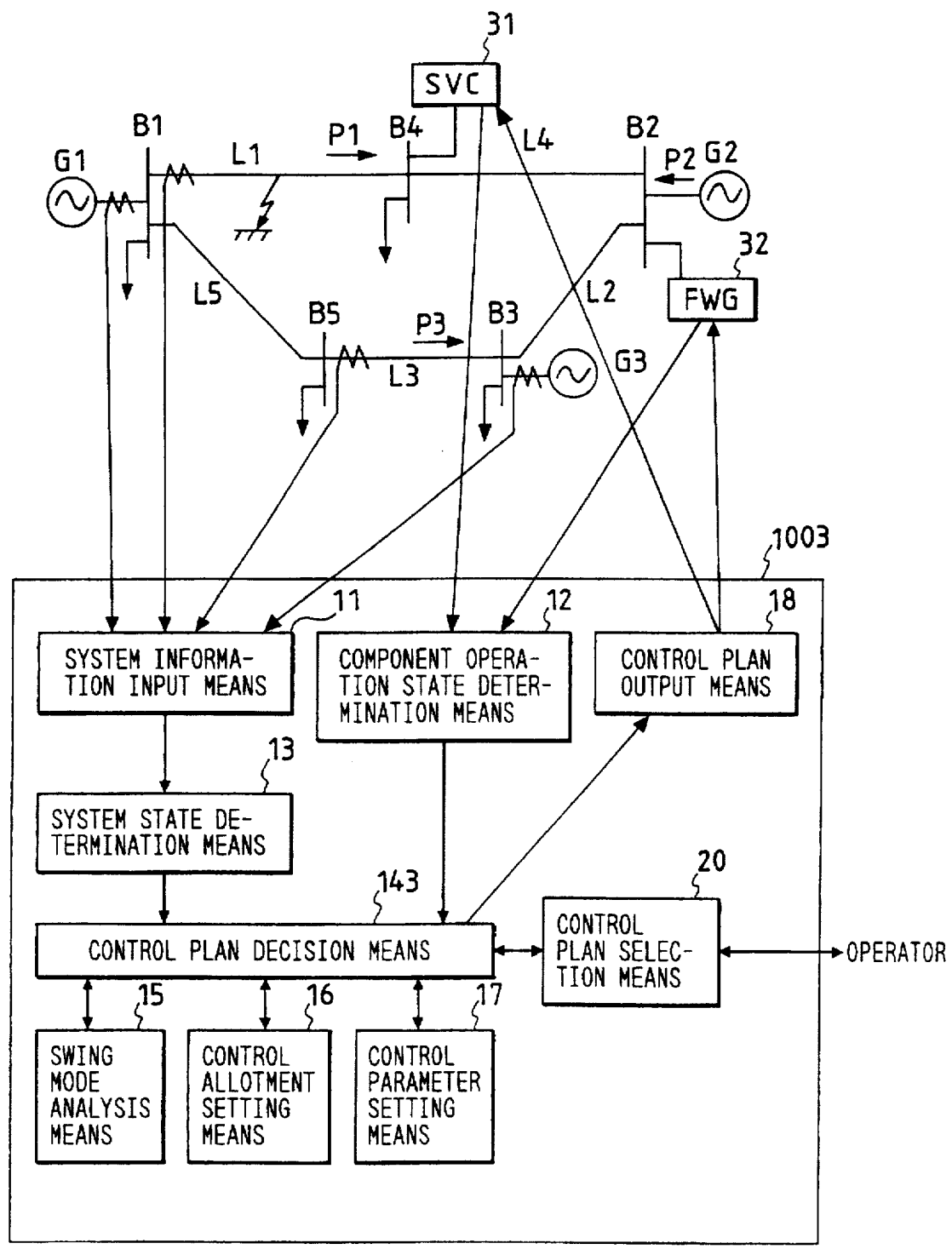
FIG. 9 is a block diagram showing a arrangement of a power system stabilization control apparatus including a control plan selection means according to the present invention.

In the following, another embodiment is explained. FIG. 9 shows a power system stabilization control apparatus 1003 having a control plan decision supporting function. The control plan decision means 143 presents control plans and evaluation results of the control plans, for example, a figure showing changes of the eigenvalues or waveforms of the time domain response simulations, via a control plan selection means 20, to an operator. When the operator selects the most adequate control plan among the presented plans and inputs it into the control plan decision means 143 via the control plan selection means 20, the control plan decision means 143 outputs the selected control plans to each of the control components via the control plan output means 18. The explained method has the effect that an operator can easily select the best control plans and directly grasp the counter measures to the disturbance.

Figure 10:
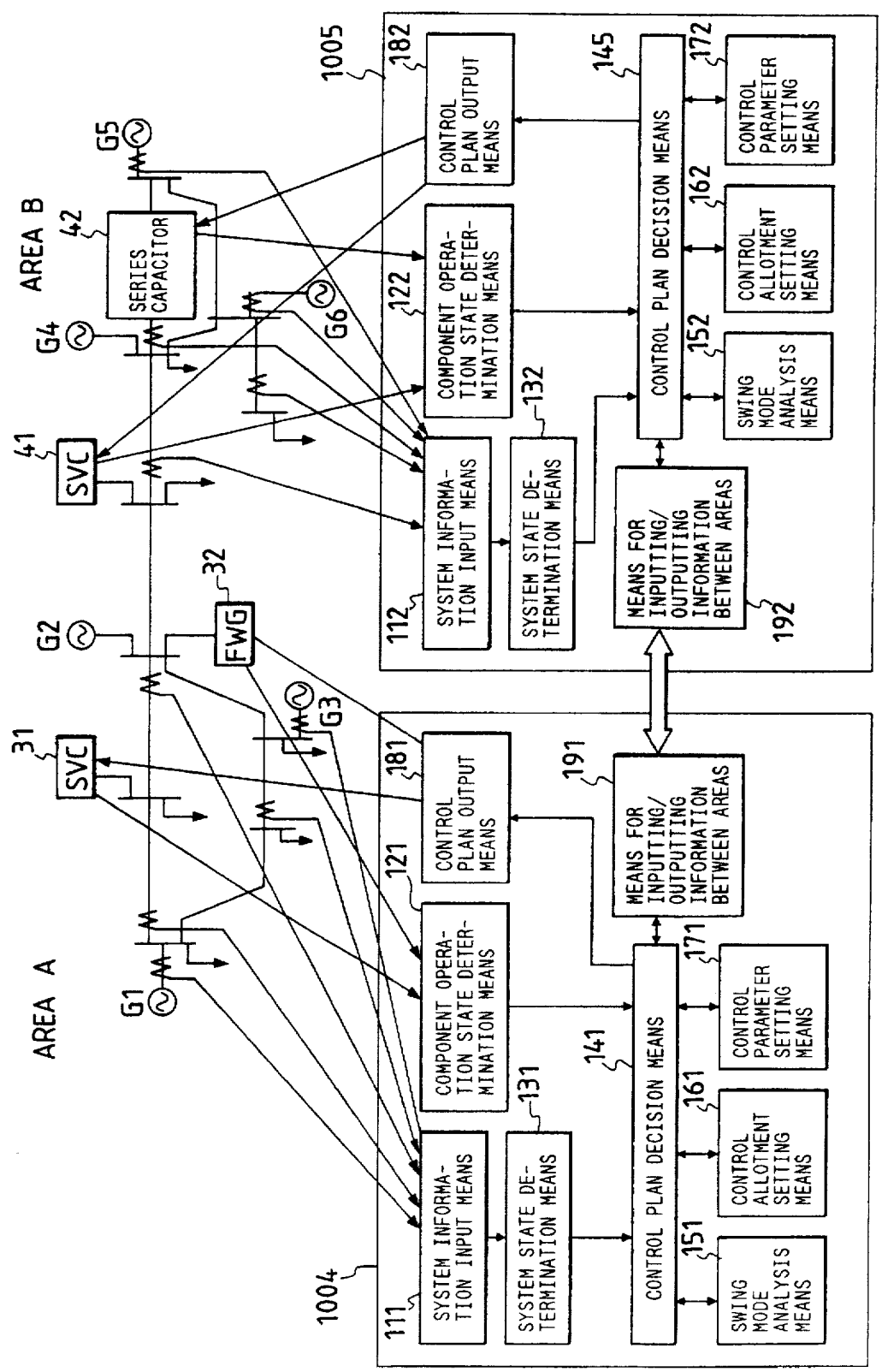
FIG. 10 is a block diagram showing an example arrangement of power system stabilization control apparatuses installed at a plurality of areas.

In the following, is explained another embodiment wherein the power system stabilization control apparatuses are distributed and installed at a plurality of areas. FIG. 10 shows an arrangement of two power system stabilization control apparatuses 1004 and 1005, the respective apparatuses being installed at each of two areas A and B. At the area A, SVC 31 and FWG 32 are used as control components, and at the area B, SVC 41 and a series capacitor 42 are the control components. Since the power system stabilization control apparatuses 1004 and 1005 have two means 191 and 192, respectively, for inputting and outputting information between areas, it is possible mutually to get and confirm system information, component operation states and control plans in the other area via the means for inputting and outputting information between areas. By the above-mentioned arrangement, controls cooperating with controls at the other area can be realized since control plans of the control components determined by the power system stabilization control apparatus in the other area can be gotten and control plans of the control components in the one area can be determined by considering the controls in the other area. Further, even if all of the system information and the component operation states on the whole power system can not be obtained due to restrictions of an output system at one area, the lacking information can be supplied by the apparatus installed at the other area. Furthermore, even if any one of the control components at one area should fail, a control component at the other area can be substituted for the failing component to suppress a power swing.

Though, in the above-mentioned embodiments, SVC and FWG are used as the control components, it is noted that the control components are not restricted to those components and such various kinds of components as SMES, a phase compensator, etc. are usable.

By the present invention, the following effects can be expected.

It is possible to suppress a power swing by cooperation among a plurality of control components provided in a power system and quickly to set an adequate control plan corresponding to power flow states and disturbance conditions. An operator also can directly and easily select the best control plans. Further, in case the power system stabilization control apparatuses according to the present invention are distributed and installed at a plurality of areas, control plans cooperating with control plans set in the other area can be also determined. And further, even if only one component is provided as the control components, it is possible to set effective control plans by analyzing swing modes and setting the control plan for suppressing the swing mode most required to be suppressed to the control components.

What is claimed is:

1. A power system stabilization control apparatus comprising:

system information input means for taking in system information from a power system in which a plurality of system stabilizing components are installed;

component operation state determination means for determining component operation states of said plurality of system stabilizing components;

system state determination means for determining system states on the basis of said system information;

control parameter adjusting means for adjusting control parameters for said plurality of system stabilizing components on the basis of said system states and said component operation states;

control parameter output means for outputting said adjusted control parameters to said plurality of system stabilizing components;

swing mode analysis means for determining swing modes generated by disturbances occurring in said power system, based on said taken-in system information; and wherein said control parameter adjusting means adjusts said control parameters of said plurality of system stabilizing components so as to suppress said generated swing modes.

2. A power system stabilization control apparatus according to claim 1, further including a control parameter setting means for setting control parameters for suppressing said swing modes to said plurality of system stabilizing components.

3. A power system stabilization control apparatus according to claim 1, wherein said swing mode analysis means analyzes swing modes of power flows of said power system.

4. A power system stabilization control apparatus according to claim 1, wherein said swing mode analysis means analyzes swing modes of voltages of said power system.

5. A power system stabilization control apparatus according to claim 1, wherein said swing mode analysis means analyzes swing modes of frequencies of said power system.

6. A power system stabilization control apparatus according to claim 1, wherein said swing mode analysis means analyzes swing modes of phases of said power system.

7. A power system stabilization control apparatus according to claim 1, wherein said swing mode analysis means executes response simulations in a time domain of said power system.

8. A power system stabilization control apparatus comprising:

system information input means for taking in system information from a power system in which a plurality of system stabilizing components are installed;

component operation state determination means for determining component operation states of said plurality of system stabilizing components;

system state determination means for determining system states on the basis of said system information;

control parameter adjusting means for adjusting control parameters for said plurality of system stabilizing components on the basis of said system states and said component operation states;

control parameter output means for outputting said adjusted control parameters to said plurality of system stabilizing components;

swing mode analysis means for analyzing swing modes generated by disturbances occurring in said power system, based on said system states and said component operation states;

control allotment setting means for extracting ones to be suppressed among said swing modes and allotting controls for suppressing said extracted ones to said plurality of system stabilizing components; and control parameter setting means for setting control parameters of said allotted controls for suppressing said extracted swing modes to said plurality of system stabilizing components.

9. A power system stabilization control apparatus comprising:

system information input means for taking in system information from a power system in which a plurality of system stabilizing components are installed;

component operation state determination means for determining component operation states of said plurality of system stabilizing components;

contingency setting means for setting disturbances to a dynamics simulation model of said power system, assumed in advance;

swing mode analysis means for analyzing swing modes generated by each of said set disturbances;

control plan table making means for preparing a control plan table storing sets of control plans for said plurality of system stabilizing components, by obtaining a control plan to suppress said swing modes analyzed to be generated by each of said set disturbances, with said plurality of system stabilizing components;

a control plan decision means for deciding a control plan in an actual disturbance occurrence by selecting one of said sets of control plans to be executed, from said control plan table, corresponding to said actually occurring disturbance, based on said determined system states and said determined component operation state; and a control plan output means for outputting said decided control plan to said plurality of system stabilizing components.

10. A power system stabilization control apparatus comprising:

system information input means for taking in system information from a power system in which a plurality of system stabilizing components are installed;

component operation state determination means for determining component operation states of said plurality of system stabilizing components;

contingency setting means for setting disturbances to a dynamics simulation model of said power system, assumed in advance;

a system state determination means for determining system states on the basis of said system information and information on said contingencies;

swing mode analysis means for analyzing swing modes to be generated by said contingency based on said determined system states and said determined component operation states;

a control allotment setting means for allotting controls for suppressing said swing modes to said plurality of system stabilizing components;

a control parameter setting means for setting control parameters of said allotted controls for suppressing said swing modes to said plurality of system stabilizing components;

control plan table making means for preparing a control plan table storing sets of control plans for said plurality of system stabilizing components, by obtaining a control plan to suppress said swing modes analyzed to be generated by each of said set disturbances, with said plurality of system stabilizing components;

a control plan decision means for deciding a control plan in an actual disturbance occurrence by selecting one of said sets of said control plans to be executed, from said control plan table, corresponding to said actually occurring disturbance, based on said determined system states and said determined component operation state; and a control plan output means for outputting said decided control plan to said plurality of system stabilizing components.

11. A power system stabilization control apparatus comprising:

system information input means for taking in system information from a power system in which a plurality of system stabilizing components are installed;

component operation state determination means for determining component operation states of said plurality of system stabilizing components;

system state determination means for determining system states on the basis of said system information;

swing mode analysis means for determining swing modes generated by disturbances occurring in said power system;

control plan decision means for deciding candidates of control plans to suppress said determined swing mode with said plurality of system stabilizing components, on the basis of said determined system states and said determined component operation states;

a control plan selection means, connected to said control plan decision means, for presenting said decided candidate control plans to an operator, and outputting one control plan selected interactively by said operator, from said decided candidates of control plans, to said control plan decision means; and a control plan output means for outputting said selected control plan to said plurality of system stabilizing components.

12. A control system including plural power system stabilization control apparatuses, each of said plural stabilization control apparatuses installed at a power system in each of plural areas, each said stabilizing control apparatus comprising:

system information input means for taking in system information from said power system in each said area in which a plurality of system stabilizing components are installed;

component operation state determination means for determining component operation states of said plurality of system stabilizing components;

system state determination means for determining system states on the basis of said system information;

control plan decision means for deciding a control plan for said plurality of system stabilizing components on the basis of said determined system states and said determined component operation states;

control plan output means for outputting said decided control plan to said plurality of system stabilizing component; and communication means for transmitting information with power system stabilizing control apparatuses in other areas, said communication means being connected to said control plan decision means, and communicating with communication means of said stabilizing control apparatuses in other areas, on at least one of said system information, said component operation states and said decided control plan, processed by each of said stabilizing control apparatuses.

13. A control method of stabilizing a power system, comprising the steps of:

determining conditions of said power system, satisfying a power flow equation on the basis of inputs of system information from said power system at which system stabilizing components are provided and states of said system stabilizing components;

obtaining swing modes to be generated by setting contingencies to said power system and simulating time responses of said power system;

allotting a control plan for suppressing said obtained swing modes to said system stabilizing components; and outputting said allotted control plan to said system stabilizing components.

14. A control method of stabilizing a power system, comprising the steps of:

determining conditions of said power system, satisfying a power flow equation on the basis of inputs of system information from said power system at which system stabilizing components are provided and state of said system stabilizing components;

obtaining swing modes to be generated, by using Fourier analysis method of dynamics of said power system;

allotting a control plan for suppressing said obtained swing modes to said system stabilizing components; and outputting said allotted control plan to said system stabilizing components.

* * * * *